United States Patent
Krafczyk et al.

(10) Patent No.: US 6,946,537 B2
(45) Date of Patent: Sep. 20, 2005

(54) SILOXANE OLIGOMERS, A PROCESS FOR THEIR PRODUCTION AND THEIR USE

(75) Inventors: Roland Krafczyk, Rheinfelden (DE); Björn Treffeisen, Gundelfingen (DE); Jaroslaw Monkiewicz, Rheinfelden (DE)

(73) Assignee: Degussa AG, Düsseldorf (DE)

(*) Notice: Subject to any disclaimer, the term of this patent is extended or adjusted under 35 U.S.C. 154(b) by 6 days.

(21) Appl. No.: 10/772,257

(22) Filed: Feb. 6, 2004

(65) Prior Publication Data

US 2004/0158090 A1 Aug. 12, 2004

Related U.S. Application Data

(62) Division of application No. 10/188,031, filed on Jul. 3, 2002, now abandoned.

(30) Foreign Application Priority Data

Jul. 6, 2001 (DE) .......................................... 101 32 942

(51) Int. Cl.$^7$ .............................................. C08G 77/24
(52) U.S. Cl. ........................... 528/42; 528/39; 525/474
(58) Field of Search ...................... 528/42, 39; 525/474

(56) References Cited

U.S. PATENT DOCUMENTS

| 5,132,047 A | 7/1992 | Tanaka et al. |
|---|---|---|
| 5,504,234 A | 4/1996 | Omura et al. |
| 5,650,474 A | 7/1997 | Yamaya et al. |
| 6,107,505 A | 8/2000 | Yoshida et al. |
| 6,331,605 B1 | 12/2001 | Lunginsland et al. |
| 6,472,481 B1 | 10/2002 | Luginsland et al. |

FOREIGN PATENT DOCUMENTS

| DE | 198 25 796 | 12/1999 |
|---|---|---|
| EP | 0 652 245 | 5/1995 |

Primary Examiner—Kuo-Liang Peng
(74) Attorney, Agent, or Firm—Smith, Gambrell & Russell, LLP

(57) ABSTRACT

Siloxane oligomers of the general formula I or II

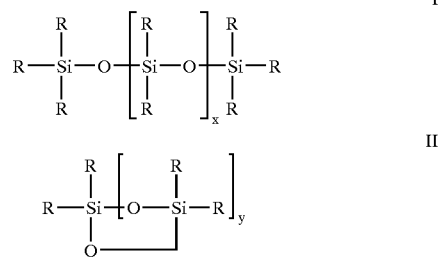

wherein at least one functionalized alkyl group is present per oligomer molecule. The siloxane oligomers are produced by oligomerization of halogenalkyltrihalogensilanes, and co-optionally co-oligomerized with ($C_1$–$C_{18}$)-alkyl-, phenyl-, aryl- or aralkyl-trihalogensilanes and/or silicon tetrachloride, in the presence of alcohol and water, following which the halogenalkyl function is optionally modified in a further step. The siloxane oligomers can be used as coupling agents in rubber mixtures or as building preservation agents.

7 Claims, No Drawings

SILOXANE OLIGOMERS, A PROCESS FOR THEIR PRODUCTION AND THEIR USE

This application is a divisional application of U.S. application Ser. No. 10/188,031 Jul. 3, 2002; now abandoned.

INTRODUCTION AND BACKGROUND

The present invention relates to siloxane oligomers, a process for their production as well as their use.

It is known to employ silanes as coupling agents. Thus, aminoalkyltrialkoxysilanes, methacryloxyalkyltrialkoxysilanes, polysulfanalkyltrialkoxysilanes, as well as mercaptoalkyltrialkoxysilanes are used as coupling agents between inorganic materials (e.g. glass fibres, metals, oxidic fillers) and organic polymers (e.g. thermosetting plastics, thermoplastic materials, elastomers) and/or as crosslinking agents and surface modification agents.

These coupling or bonding agents form bonds with the filler as well as the elastomer and thereby produce a good interaction between the filler surface and the elastomer. They reduce the viscosity of the mixture and facilitate the dispersion of the filler.

Furthermore it is known that the use of commercially available silane coupling agents (DE 22 55 577) with three alkoxy substituents on the silicon atom leads to the release of considerable amounts of alcohol during the mixing process.

This amount of alcohol can be reduced if corresponding siloxane oligomers are used instead of monomeric silanes. Siloxane oligomers and siloxane co-oligomers produced by condensation and co-condensation of silanes are described in EP 0 518 057 B1 and in EP 0 652 245 B1.

Disadvantages of the known siloxane oligomers are the absence of functionalized alkyl groups, which are necessary for subsequent chemical reactions, and the complicated process for the production of the alkoxysiloxanes by reacting the corresponding chlorosilanes with alcohol followed by removal of the alcohol in the oligomerization or co-oligomerization with other alkoxysilanes.

An object of the present invention is to produce siloxane oligomers having functionalized alkyl groups.

SUMMARY OF THE INVENTION

The above and other objects of the invention can be achieved by siloxane oligomers of the formulae I or II

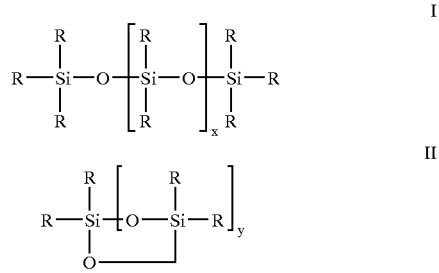

in which x denotes an integer from 0 to 1000, y denotes a number from 1 to 1000, and the substituents R are identical or different and are members selected from the groups consisting of functionalized alkyl groups, $(C_1-C_{18})$ alkyl, $(C_1-C_4)$alkoxy, preferably methoxy or ethoxy groups, $(C_1-C_4)$haloalkoxy, phenyl, aryl, aralkyl and hydroxy groups, which are characterized in that at least one functionalized alkyl group is present per oligomer molecule.

A maximum of one functionalized alkyl group per silicon atom can be present.

The functionalized alkyl group can be a halogenated alkyl, aminoalkyl, methacryloxyalkyl, mercaptoalkyl, thiocyanatoalkyl or azidoalkyl group.

The functionalized alkyl group can be a disulfide bridge or polysulfide bridge $S_x$, where x is between 2 and 8, that joins two functionalized alkyl groups via the disulfide or polysulfide bridge.

DETAILED DESCRIPTION OF INVENTION

The siloxane oligomers according to the invention may be present as individual compounds having a defined molecular weight as well as an oligomer mixture having a molecular weight distribution.

The invention also provides a process for the production of the siloxane oligomers according to the invention, wherein halogenalkyltrihalogensilanes are oligomerized in the presence of alcohol and water and are optionally co-oligomerized with $(C_1-C_{18})$-alkyl-, phenyl-, aryl- or aralkyl-trihalogensilanes and/or silicon tetrachloride and the halogen alkyl function is optionally modified in a further step.

Propanol, ethanol, methanol, diols or polyols may be used as alcohol.

$(C_1-C_{18})$-alkyltrichlorosilanes, for example methyltrichlorsilane, ethyltrichlorsilane or propyltrichlorosilane, may be used as alkyltrihalogensilane.

The amount of water may be calculated from the required degree of oligomerization. The hydrohalic acid that is released may then be removed.

The addition of a conventional catalyst for the oligomerization and/or co-oligomerization, such as for example hydrogen chloride, may be dispensed with since it is formed during the reaction of the halogensilane with alcohol. The chlorosilane may be added dropwise to the alcohol/water mixture or vice versa.

The halogenalkyl function may be modified with the following compounds:

with ammonia with separation of ammonium halide for the production of the aminoalkylsiloxane oligomers, with sodium methacrylate or potassium methacrylate with separation of sodium or potassium halide for the production of the methacryloxyalkylsiloxane oligomers, with sodium polysulfide or sodium sulfide and sulfur or sodium polysulfide and sodium sulfide with separation of sodium halide for the production of the bis[3-triethoxy-alkyl]polysulfane-siloxane oligomers or bis[3-triethoxy-alkyl]disulfane-siloxane oligomers, with ammonia and hydrogen sulfide or ammonium hydrogen sulfide with separation of ammonium halide, or sodium or potassium hydrogen sulfide with separation of sodium or potassium halide for the production of mercaptoalkylsiloxane oligomers, with sodium, potassium or ammonium rhodanide with separation of sodium, potassium or ammonium halide for the production of the thiocyanatoalkylsiloxane oligomers, with sodium azide with separation of sodium halide for the production of the azidoalkylsiloxane oligomers.

For the modification of the halogenalkyl function the alcohol may be separated.

The siloxane oligomers according to the invention have the advantage that they contain functionalized alkyl groups that are available for further reactions.

The siloxane oligomers according to the invention may be used as coupling agents in rubber mixtures or as building preservative agents.

The invention also provides rubber mixtures which are characterized in that they contain rubber, precipitated silica and/or carbon black, the siloxane oligomers according to the invention, and optionally further rubber auxiliary substances.

For the production of the rubber mixtures according to the invention natural rubber as well as synthetic rubbers are suitable. Preferred synthetic rubbers are described for example in W. Hofmann, Kautschuktechnologie, Genter Verlag, Stuttgart 1980, and include, inter alia

- polybutadiene (BR)
- polyisoprene (IR)
- styrene/butadiene copolymers with styrene contents of 1 to 60 wt. %, preferably 5 to 50 wt. % (E-SBR or L-SBR)
- isobutylene/isoprene copolymers (IIR)
- butadiene/acrylonitrile copolymers with acrylonitrile contents of 5 to 60 wt. %, preferably 10 to 50 wt. % (NBR)
- ethylene/propylene/diene copolymers (EPDM) as well as mixtures of these rubbers.

The rubber mixtures according to the invention may contain further rubber auxiliary products such as, inter alia, reaction accelerators, reaction retarders, anti-ageing agents, stabilizers, processing auxiliaries, plasticizers, waxes, metal oxides as well as activators such as triethanolamine, polyethylene glycol and hexanetriol, which are known in the rubber industry.

The rubber auxiliary substances may be used in conventional amounts that are governed by, inter alia, the intended use. Conventional amounts are for example 0.1 to 50 wt. %, referred to rubber.

Sulfur, organic sulfur donors or radical-forming agents may serve as crosslinking agents. The rubber mixtures according to the invention may moreover contain vulcanization accelerators.

Examples of suitable vulcanization accelerators are mercaptobenzothiazoles, sulfenamides, guanidines, thiurams, dithiocarbamates, thioureas and thiocarbonates.

The vulcanization accelerators and crosslinking agents may be used in amounts of 0.1 to 10 wt. %, preferably 0.1 to 5 wt. %, referred to rubber.

The mixing of the rubbers with the filler and the siloxane oligomers according to the invention, and optionally rubber auxiliary substances, may be carried out in conventional mixing equipment such as rollers, internal kneaders and combined mixers/extruders. Normally such rubber mixtures are formulated in internal kneaders, in which the rubbers, the fillers and the siloxane oligomers according to the invention, and optionally the rubber auxiliary substances, are first of all mixed in in one or more successive thermomechanical mixing stages at 100° to 170° C. In this connection the order of the addition and the time at which the individual components are added may have a decisive effect on the resultant mixture properties. The rubber mixture that is thereby obtained is then normally added to an internal kneader or to a roller at 40–110° C. together with the crosslinking agents and processed into the so-called raw mixture for the subsequent process steps, such as for example shaping and vulcanization.

The vulcanization of the rubber mixtures according to the invention may take place at temperatures from 80° to 200° C., preferably 130° to 180° C., optionally under a pressure of 10 to 200 bar.

The rubber mixtures according to the invention are suitable for the production of moulded articles, for example for the production of pneumatic tires, tire treads, cable sheathings, hoses, drive belts, conveyor belts, roller coatings, tires, shoe soles, sealing rings, profiled sections and damping elements.

The siloxane oligomers according to the invention have the advantages of a low release of alcohol in the reaction in rubber and the fact that they contain functionalized alkyl groups for subsequent chemical reactions.

EXAMPLE 1

Reaction of a Chloropropyltrichlorosilane-propyltrichlorosilane Mixture with Water and Ethanol 106.7 g of chloropropyltrichlorosilane and 193.6 g of propyltrichlorosilane are added as a mixture to a 1 liter capacity three-necked flask equipped with stirrer, cooler and nitrogen inlet tube. A solution of 380 ml of ethanol and 17.2 g of water is added dropwise within 50 minutes while cooling. The reaction mixture is then heated for 4 hours under reflux and the hydrogen chloride gas is expelled. 228.0 g of a clear, pale yellow liquid are obtained after removing the excess ethanol. The ratio of propyl radical to chloropropyl radical is 2 to 1.

$^1$H-NMR (CDCl$_3$): δ 0.60 (m, 4 H, Si—C$\underline{H}_2$—CH$_2$—CH$_3$), 0.75 (m, 2 H, Si—C$\underline{H}_2$—CH$_2$—CH$_2$—Cl), 0.95 (t, 6 H, $^3J_{H—H}$=7 Hz, Si—CH$_2$—CH$_2$—C$\underline{H}_3$), 1.20 (m, 12 H, C$\underline{H}_3$—CH$_2$—O—Si), 1.45 (m, 4 H, Si—CH$_2$—C$\underline{H}_2$—CH$_3$), 1.85 (m, 2 H, Si—CH$_2$—C$\underline{H}_2$—CH$_2$—Cl), 3.50 (m, 2 H, Si—CH$_2$—CH$_2$—C$\underline{H}_2$—Cl), 3.80 (m, 8 H, CH$_3$—C$\underline{H}_2$—O—Si); hydrolyzable chloride: 0.16%.

EXAMPLE 2

Reaction of a Chloropropyltrichlorosilane-octyltrichlorosilane Mixture with Water and Ethanol 106.7 g of chloropropyltrichlorosilane and 111.8 g of octyltrichlorosilane are added as a mixture to a 1 liter capacity three-necked flask equipped with stirrer, cooler and nitrogen inlet tube. A solution of 240 ml of ethanol and 10.7 g of water is added dropwise within 40 minutes while cooling. The reaction mixture is then heated for 4 hours under reflux and the hydrogen chloride gas is expelled. 182.3 g of a clear, colorless liquid are obtained after removing the excess ethanol. The ratio of octyl radicals to chloropropyl radicals is 1 to 1.

$^1$H-NMR (CDCl$_3$): δ 0.60 (m, 2 H, Si—C$\underline{H}_2$—(CH$_2$)$_6$—CH$_3$), 0.80 (m, 2 H, Si—C$\underline{H}_2$—CH$_2$—CH$_2$—Cl), 0.90 (t, 3 H, $^3J_{H—H}$=7 Hz, Si—CH$_2$—(CH$_2$)$_6$—C$\underline{H}_3$), 1.25 (m, 9 H, C$\underline{H}_3$—CH$_2$—O—Si), 1.3–1.5 (m, 12 H, Si—CH$_2$—(C$\underline{H}_2$)$_6$—CH$_3$), 1.85 (m, 2 H, Si—CH$_2$—C$\underline{H}_2$CH$_2$—Cl), 3.55 (m, 2 H, Si—CH$_2$—CH$_2$—C$\underline{H}_2$—Cl), 3.80 (m, 6 H, CH$_3$—C$\underline{H}_2$—O—Si); hydrolzable chloride: 0.14%

EXAMPLE 3

Reaction of a Chloropropyltrichlorosilane-hexadecyltrichlorosilane Mixture with Water and Ethanol 106.7 g of chloropropyltrichlorosilane and 74.1 g of hexadecyltrichlorosilane are added as a mixture to a 1 liter capacity three-necked flask equipped with stirrer, cooler and nitrogen inlet tube. A solution of 180 ml of ethanol and 8.0 g of water is added dropwise within 50 minutes while cooling. The reaction mixture is then heated for 4 hours under reflux and the hydrogen chloride gas is expelled. 145.3 g of a clear, pale yellow liquid are obtained after removing the excess ethanol. The ratio of hexadecyl radicals to chloropropyl radicals is 1 to 2.5.

$^1$H-NMR (CDCl$_3$): δ0.65 (m, 2 H, Si—C$\underline{H}_2$—(CH$_2$)$_{14}$—CH$_3$), 0.80 (m, 5 H, Si—C$\underline{H}_2$—CH$_2$—CH$_2$—Cl), 0.85 (t, 3 H, $^3J_{H-H}$=7 Hz, Si—CH$_2$—(CH$_2$)$_{14}$—C$\underline{H}_3$), 1.25 (m, 15 H, C$\underline{H}_3$—CH$_2$—O—Si), 1.3–1.5 (m, 28 H, Si—CH$_2$—(C$\underline{H}_2$)$_{14}$—CH$_3$), 1.90 (m, 5 H, Si—CH$_2$—C$\underline{H}_2$—CH$_2$—Cl), 3.55 (m, 5 H, Si—CH$_2$—CH$_2$—C$\underline{H}_2$—Cl), 3.80 (m, 10 H, CH$_3$—C$\underline{H}_2$—O—Si); hydrolyzable chloride: <0.1%.

EXAMPLE 4

Reaction of the Chloropropylsilane-propylsilane Co-oligomers with Hydrogen Sulfide and Ammonia 225 g of the co-oligomer from Example 1 in 250 ml of ethanol are placed in a 1 liter capacity autoclave equipped with stirrer. After rendering the contents inert by pumping in nitrogen twice followed by evacuation, 21 g of ammonia and 34 g of hydrogen sulfide are forced into the autoclave within 30 minutes. After stirring for 12 hours at 120° C. the autoclave is cooled to room temperature and the excess ammonia/hydrogen sulfide mixture is blown off by a hydrogen peroxide solution. After filtering off the precipitated ammonium chloride and removing the ethanol from the filtrate, 221 g of a clear colorless liquid are obtained.

$^1$H-NMR (CDCl$_3$): δ0.60 (m, 4 H, Si—C$\underline{H}_2$—CH$_2$—CH$_3$), 0.75 (m, 2 H, Si—C$\underline{H}_2$—CH$_2$—CH$_2$—SH), 0.95 (t, 6 H, $^3J_{H-H}$=7 Hz, Si—CH$_2$—CH$_2$—C$\underline{H}_3$), 1.20 (m, 12 H, C$\underline{H}_3$—CH$_2$—O—Si), 1.45 (m, 4H, Si—CH$_2$—C$\underline{H}_2$—CH$_3$), 1.85 (m, 2 H, Si—CH$_2$—C$\underline{H}_2$—CH$_2$—SH), 2.60 (m, 2 H, Si—CH$_2$—CH$_2$—C$\underline{H}_2$—SH), 3.80 (m, 8 H, CH$_3$—C$\underline{H}_2$—O—Si).

EXAMPLE 5

Reaction of the Chloropropylsilane-Octylsilane Co-Oligomer with Hydrogen Sulfide and Ammonia 180 g of the co-oligomer from Example 2 in 200 ml of ethanol are placed in a 1 liter capacity autoclave equipped with stirrer. After rendering the contents inert by pumping in nitrogen twice followed by evacuation, 21 g of ammonia and 34 g of hydrogen sulfide are forced into the autoclave within 30 minutes. After stirring for 12 hours at 120 ° C. the autoclave is cooled to room temperature and the excess ammonia/hydrogen sulfide mixture is blown off by a hydrogen peroxide solution. After filtering off the precipitated ammonium chloride and removing the ethanol from the filtrate, 176 g of a clear colorless liquid are obtained.

$^1$H-NMR (CDCl$_3$): δ0.60 (m, 2 H, Si—C$\underline{H}_2$—(CH$_2$)$_6$—CH$_3$), 0.80 (m, 2 H, Si—C$\underline{H}_2$—CH$_2$—CH$_2$—SH), 0.90 (t, 3 H, $^3J_{H-H}$=7 Hz, Si—CH$_2$—(CH$_2$)$_6$—C$\underline{H}_3$), 1.25 (m, 9 H, C$\underline{H}_3$—CH$_2$—O—Si), 1.3–1.5 (m, 12 H, Si—CH$_2$—(C$\underline{H}_2$)$_6$—CH$_3$), 1.85 (m, 2 H, Si—CH$_2$—C$\underline{H}_2$—CH$_2$—SH), 2.60 (m, 2 H, Si—CH$_2$—CH$_2$—C$\underline{H}_2$—SH), 3.80 (m, 6 H, CH$_3$—C$\underline{H}_2$—O—Si).

EXAMPLE 6

Reaction of the Chloropropylsilane-hexadecylsilane Co-oligomer with Hydrogen Sulfide and Ammonia 145 g of the co-oligomer from Example 3 in 150 ml of ethanol are placed in a 1 liter capacity autoclave equipped with stirrer. After rendering the contents inert by pumping in nitrogen twice followed by evacuation, 21 g of ammonia and 34 g of hydrogen sulfide are forced into the autoclave within 30 minutes. After stirring for 12 hours at 120 ° C. the autoclave is cooled to room temperature and the excess ammonia/hydrogen sulfide mixture is blown off by a hydrogen peroxide solution. After filtering off the precipitated ammonium chloride and removing the ethanol from the filtrate, 139 g of a clear colorless liquid are obtained.

$^1$H—NMR (CDCl$_3$): δ0.65 (m, 2 H, Si—C$\underline{H}_2$—(CH$_2$)$_{14}$—CH$_3$), 0.80 (m, 5 H, Si—C$\underline{H}_3$—CH$_2$—CH$_2$—SH), 0.85 (t, 3 H, $^3J_{H-H}$=7 Hz, Si—CH$_2$—(CH$_2$)$_{14}$—CH$_3$), 1.25 (m, 15 H, C$\underline{H}_3$—CH$_2$—O—Si), 1.3–1.5 (m, 28 H, Si—CH$_2$—(C$\underline{H}_2$)$_{14}$—CH$_3$), 1.90 (m, 5 H, Si—CH$_2$—C$\underline{H}_2$—CH$_2$—SH), 2.6 (m, 5H, Si—CH$_2$—CH$_2$—C$\underline{H}_2$—SH), 3.80 (m, 10 H, CH$_3$—C$\underline{H}_2$—O—Si).

EXAMPLE 7

Reaction of the Chloropropylsilane-propylsilane Co-oligomer with Ammonia 221 g of the co-oligomer from Example 1 in 250 ml of ethanol are placed in a 2 liter capacity autoclave equipped with stirrer. After rendering the contents inert by pumping in nitrogen twice followed by evacuation, 150 g of ammonia are forced into the autoclave within 30 minutes. After stirring for 16 hours at 120° C. the autoclave is cooled to room temperature and the excess ammonia is blown off. After filtering off the precipitated ammonium chloride and removing the ethanol from the filtrate, 216 g of a clear pale yellow liquid are obtained.

$^1$H-NMR (CDCl$_3$): δ0.60 (m, 4 H, Si—CH$\underline{H}_2$CH$_2$—CH$_3$), 0.65 (m, 2 H, Si—C$\underline{H}_2$—CH$_2$—CH$_2$—NH$_2$), 0.95 (t, 6 H, $^3J_{H-H}$=7 Hz, Si—CH$_2$—CH$_2$—C$\underline{H}_3$), 1.20 (m, 12 H, C$\underline{H}_3$—CH$_2$—O—Si), 1.45 (m, 4H, Si—CH$_2$—C$\underline{H}_2$—CH$_3$), 1.55 (m, 2 H, Si—CH$_2$—C$\underline{H}_2$—CH$_2$—NH$_2$), 2.60 (m, 2 H, Si—CH$_2$—CH$_2$—C$\underline{H}_2$—NH$_2$), 3.80 (m, 8 H, CH$_3$—C$\underline{H}_2$—O—Si).

EXAMPLE 8

Reaction of the Chloropropylsilane-octylsilane Co-oligomer with Sodium Rhodanide 105 g of the co-oligomer from Example 2 and 23 g of sodium rhodanide in 100 ml of ethanol are placed in a 1 liter capacity autoclave equipped with stirrer. After rendering the contents inert by forcing in nitrogen twice, the contents are stirred for 8 hours at 115° C. under the intrinsic pressure. After cooling to room temperature, filtering off the precipitated sodium chloride and removing the ethanol from the filtrate, 108 g of a clear yellow liquid are obtained.

$^1$H-NMR (CDCl$_3$): δ0.60 (m, 2 H, Si—C$\underline{H}_2$—(CH$_2$)$_6$—CH$_3$), 0.75 (m, 2 H, Si—C$\underline{H}_2$—CH$_2$—CH$_2$—SCN), 0.95 (t, 3 H, $^3J_{H-H}$=7 Hz, Si—CH$_2$—(CH$_2$)$_6$—C$\underline{H}_3$), 1.20 (m, 12 H, C$\underline{H}_3$—CH$_2$—O—Si), 1.3–1.5 (m, 12 H, Si—CH$_2$—(CH$\underline{H}_2$)$_6$—CH$_3$), 1.95 (m, 2 H, Si—CH$_2$—C$\underline{H}_2$—CH$_2$—SCN), 3.00 (m, 2 H, Si—CH$_2$—CH$_2$—C$\underline{H}_2$—SCN), 3.80 (m, 8 H, CH$_3$—C$\underline{H}_2$—O—Si).

EXAMPLE 9

Reaction of the Chloropropylsilane-octylsilane Co-oligomer with Sodium Methacrylate 102 g of the co-oligomer from Example 2, 30 g of sodium methacrylate and 50 mg of N,N'-diphenyl-p- phenylenediamine in 100 ml of DMF are placed in a 1 liter capacity autoclave equipped with stirrer. After rendering the contents inert by forcing in nitrogen twice, the contents are stirred for 12 hours at 115° C. under the intrinsic pressure. After cooling to room temperature, filtering off the precipitated sodium chloride, removing the ethanol from the filtrate and renewed filtration, 112 g of a clear colorless liquid are obtained.

$^{1}$H-NMR (CDCl$_3$): δ0.60 (m, 2 H, Si—CH$_2$—(CH$_2$)$_6$—CH$_3$), 0.70 (m, 2 H, Si—CH$_2$—CH$_2$—CH$_2$—O—C(=O)—C(CH$_3$)=CH$_2$)), 0.95 (t, 3 H, $^{3}J_{H-H}$=7 Hz, Si—CH$_2$—(CH$_2$)$_6$—CH$_3$), 1.20 (m, 12 H, CH$_3$—CH$_2$—O—Si), 1.3–1.5 (m, 12 H, Si—CH$_2$—(CH$_2$)$_6$—CH$_3$), 1.80 (m, 2 H, Si—CH$_2$—CH$_2$—CH$_2$—O—C(=O)—C(CH$_3$)=CH$_2$), 2.00 (m, 3 H, Si—CH$_2$—CH$_2$—CH$_2$—O—C(=O)—C(CH$_3$)=CH$_2$), 3.80 (m, 8 H, CH$_3$—CH$_2$—O—Si), 4.15 (m, 2 H, Si—CH$_2$—CH$_2$—CH$_2$—O—C(=O)—C(CH$_3$)=CH$_2$), 5.50 and 6.10 (2 s, H Si—CH$_2$—CH$_2$—CH$_2$—O—C(=O)—C(CH$_3$)=CH$_2$).

EXAMPLE 10

Reaction of the Chloropropylsilane-octylsilane Co-oligomer with Sodium Polysulfide 101 g of the co-oligomer from Example 2 in 100 ml of ethanol are placed in a 1 liter capacity flask equipped with stirrer and cooler. After adding 25 g of sodium polysulfide (Na$_2$S$_4$) the contents are stirred under nitrogen for 4 hours at 82° C. After cooling to room temperature, filtering of the precipitated sodium chloride and removing the ethanol from the filtrate, 109 g of a viscous, orange liquid are obtained.

$^{1}$H-NMR (CDCl$_3$): δ0.60 (m, 2 H, Si—CH$_2$—(CH$_2$)$_6$—CH$_3$), 0.75 (m, 2 H, Si—CH$_2$—CH$_2$—S), 0.95 (t, 3 H, $^{3}J_{H-H}$=7 Hz, Si—CH$_2$—(CH$_2$)$_6$—CH$_3$), 1.20 (m, 12 H, CH$_3$—CH$_2$—O—Si), 1.3–1.5 (m, 12 H, Si—CH$_2$—(CH$_2$)$_6$—CH$_3$), 1.7–2.0 (m, 2 H, Si—CH$_2$—CH$_2$—S), 2.7–3.1 (m, 2 H, Si—CH$_2$—CH$_2$—S), 3.80 (m, 8 H, CH$_3$—CH$_2$—O—Si).

Further modifications and variations will be apparent to those skilled in the art from the foregoing and are intended to be encompassed by the claims appended hereto.

German priority application 101 32 942.3 of Jul. 6, 2001 is relied on and incorporated hrein by reference.

We claim:

1. A process for the production of siloxane oligomers of the general formulae I or II

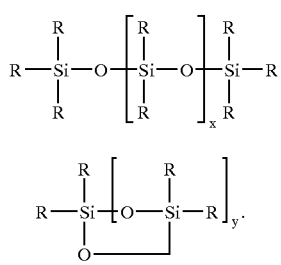

in which x is an integer from 0 to 1000, y is a number from 1 to 1000, and the substituents R are identical or different and consist of functionalized alkyl groups, (C$_1$–C$_{18}$)alkyl, (C$_1$–C$_4$)alkoxy, (C$_1$–C$_4$)haloalkoxy, phenyl, aryl, aralkyl or hydroxy groups, wherein at least one functionalized alkyl group is present per oligomer molecule, the method comprising:

treating a halogenalkyltrihalogensilane to oligomerization in the presence of alcohol and water and co-oligomerized with at least one of a (C$_1$–C$_{18}$)-alkyl-, phenyl, aryl- or aralkyl-trihalogensilane and silicon tetrachloride, and modifying the halogenalkyl function with ammonia and separating ammonium halide.

2. A process for the production of siloxane oligomers of the general formulae I or II

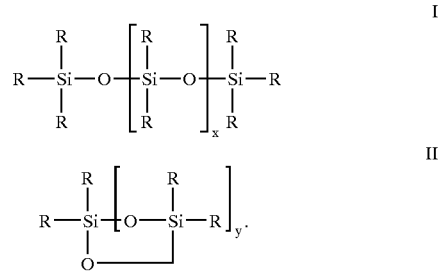

in which x is an integer from 0 to 1000, y is a number from 1 to 1000, and the substituents R are identical or different and consist of functionalized alkyl groups, (C$_1$–C$_{18}$)alkyl, (C$_1$–C$_4$)alkoxy, (C$_1$–C$_4$)haloalkoxy, phenyl, aryl, aralkyl or hydroxy groups, wherein at least one functionalized alkyl group is present per oligomer molecule, the method comprising:

treating a halogenalkyltrihalogensilane to oligomerization in the presence of alcohol and water and co-oligomerized with at least one of a (C$_1$–C$_{18}$)-alkyl-, phenyl, aryl- or aralkyl-trihalogensilane and silicon tetrachloride, and modifying the halogenalkyl function with sodium methacrylate or potassium methacrylate and separating sodium halide or potassium halide.

3. A process for the production of siloxane oligomers of the general formulae I or II

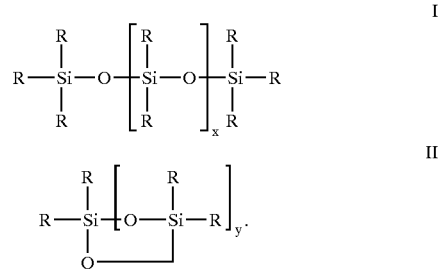

in which x is an integer from 0 to 1000, y is a number from 1 to 1000, and the substituents R are identical or different and consist of functionalized alkyl groups, (C$_1$–C$_{18}$)alkyl, (C$_1$–C$_4$)alkoxy, (C$_1$–C$_4$)haloalkoxy, phenyl, aryl, aralkyl or hydroxy groups, wherein at least one functionalized alkyl group is present per oligomer molecule, the method comprising:

treating a halogenalkyltrihalogensilane to oligomerization in the presence of alcohol and water and co-oligomerized with at least one of a (C$_1$–C$_{18}$)-alkyl-, phenyl, aryl- or aralkyl-trihalogensilane and silicon tetrachloride, and modifying the halogenalkyl function with ammonia and hydrogen sulfide or ammonium hydrogen sulfide and separating ammonium halide, or modifying with sodium hydrogen sulfide or potassium hydrogen sulfide separating sodium halide or potassium halide.

4. A process for the production of siloxane oligomers of the general formulae I or II

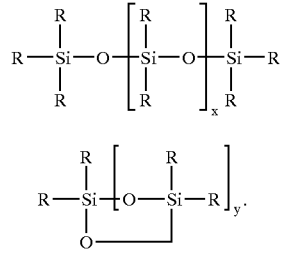

in which x is an integer from 0 to 1000, y is a number from 1 to 1000, and the substituents R are identical or different and consist of functionalized alkyl groups, $(C_1-C_{18})$alkyl, $(C_1-C_4)$alkoxy, $(C_1-C_4)$haloalkoxy, phenyl, aryl, aralkyl or hydroxy groups, wherein at least one functionalized alkyl group is present per oligomer molecule, the method comprising:

treating a halogenalkyltrihalogensilane to oligomerization in the presence of alcohol and water and co-oligomerized with at least one of a $(C_1-C_{18})$-alkyl-, phenyl, aryl- or aralkyl-trihalogensilane and silicon tetrachloride, and modifying the halogenalkyl function with sodium, potassium or ammonium rhodanide and separating sodium, potassium or ammonium halide.

5. A process for the production of siloxane oligomers of the general formulae I or II

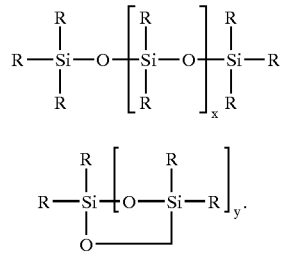

in which x is an integer from 0 to 1000, y is a number from 1 to 1000, and the substituents R are identical or different and consist of functionalized alkyl groups, $(C_1-C_{18})$alkyl, $(C_1-C_4)$alkoxy, $(C_1-C_4)$haloalkoxy, phenyl, aryl, aralkyl or hydroxy groups, wherein at least one functionalized alkyl group is present per oligomer molecule, the method comprising:

treating a halogenalkyltrihalogensilane to oligomerization in the presence of alcohol and water and co-oligomerized with at least one of a $(C_1-C_{18})$-alkyl-, phenyl, aryl- or aralkyl-trihalogensilane and silicon tetrachloride, and modifying the halogenalkyl function with sodium azide and separating sodium halide.

6. A process for the production of siloxane oligomers of the general formulae I or II

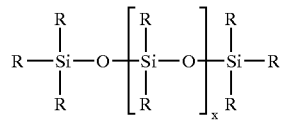

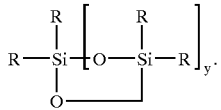

in which x is an integer from 0 to 1000, y is a number from 1 to 1000, and the substituents R are identical or different and consist of functionalized alkyl groups, $(C_1-C_{18})$alkyl, $(C_1-C_4)$alkoxy, $(C_1-C_4)$haloalkoxy, phenyl, aryl, aralkyl or hydroxy groups, wherein at least one functionalized alkyl group is present per oligomer molecule, the method comprising:

treating a halogenalkyltrihalogensilane to oligomerization in the presence of alcohol and water and co-oligomerized with at least one of a $(C_1-C_{18})$-alkyl-, phenyl, aryl- or aralkyl-trihalogensilane and silicon tetrachloride, and modifying the halogenalkyl function with sodium polysulfide or with sodium sulfide and sulfur or sodium polysulfide and sodium sulfide, and separating sodium halide.

7. A process for the production of siloxane oligomers of the general formulae I or II

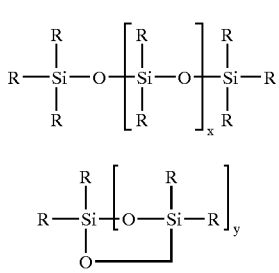

in which x is an integer from 0 to 1000, y is a number from 1 to 1000, and the substituents R are identical or different and consist of functionalised alkyl groups, $(C_1-C_{18})$ alkyl, $(C_1-C_4)$alkoxy, $(C_1-C_4)$haloalkoxy, phenyl, aryl, aralkyl or hydroxy groups, wherein at least one functionalised alkyl group is present per oligomer molecule, the method comprising:

treating a halogenalkyltrihalogensilane to oligomerization in the presence of alcohol and water and optionally co-oligomerized with at least one of a $(C_1-C_{18})$-alkyl-, phenyl-, aryl- or aralkyl-trihalogensilane and silicon tetrachloride, and modifying the halogenalkyl function with:

a) ammonia and separating ammonium halide,
b) sodium methacrylate or potassium methacrylate and separating sodium halide or potassium halide,
c) ammonia and hydrogen sulfide or ammonium hydrogen sulfide and separating ammonium halide,
d) sodium hydrogen sulfide or potassium hydrogen sulfide and separating sodium halide or potassium halide,
e) sodium, potassium or ammonium rhodanide and separating sodium, potassium or ammonium halide,
f) sodium azide and separating sodium halide, or
g) sodium polysulfide, sodium sulfide and sulfur, or sodium polysulfide and sodium sulfide, and separating sodium halide.

* * * * *